United States Patent [19]

Herrmann et al.

[11] Patent Number: 5,914,376
[45] Date of Patent: Jun. 22, 1999

[54] CATALYST FOR THE POLYMERIZATION OF OLEFINS, PROCESS FOR THE PREPARATION THEREOF, AND USE THEREOF

[75] Inventors: Hans-Friedrich Herrmann, Darmstadt; Bernd Bachmann, Eppstein/Taunus; Volker Dolle, Kelkheim; Walter Spaleck, Liederbach, all of Germany

[73] Assignee: Targor GmbH, Germany

[21] Appl. No.: 08/477,087

[22] Filed: Jun. 7, 1995

Related U.S. Application Data

[62] Division of application No. 08/279,712, Jul. 25, 1994, abandoned, which is a continuation of application No. 08/006,753, Jan. 21, 1993.

[51] Int. Cl.[6] .................................................. C08F 4/642
[52] U.S. Cl. ..................... 526/160; 526/127; 526/943; 502/103; 502/117
[58] Field of Search .................................. 526/127, 160; 502/103, 117

[56] References Cited

U.S. PATENT DOCUMENTS

| | | | |
|---|---|---|---|
| 4,542,199 | 9/1985 | Kaminsky et al. | 502/117 X |
| 4,658,078 | 4/1987 | Slaugh et al. | 502/117 X |
| 4,808,561 | 2/1989 | Welborn, Jr. | 502/104 |
| 5,120,696 | 6/1992 | Tsutsui et al. | 502/113 |

FOREIGN PATENT DOCUMENTS

| | | |
|---|---|---|
| B-31222 | 9/1989 | Australia . |
| 0033805 | 8/1991 | Canada . |
| 0363029 | 4/1990 | European Pat. Off. . |
| 0442300 | 8/1991 | European Pat. Off. . |

OTHER PUBLICATIONS

Storr, A., et al, *J. Am. Chem. Soc.* 90: pp. 3173–3177 (1968).
Pasynkiewicz, S., *Polyhedron* 9: pp.429–453 (1990).
Herrman.H.F., et al, *Polymer Commun.* 32: pp. 58–61 (1991).

*Primary Examiner*—Mark Nagumo
*Attorney, Agent, or Firm*—Connolly & Hutz

[57] ABSTRACT

Catalyst for the polymerization of olefins, process for the preparation thereof, and the use thereof.

The present invention relates to a heterogeneous catalyst for the polymerization of olefins, comprising the product of the reaction of an aluminoxane which is insoluble in aliphatic and aromatic hydrocarbons, with at least one metallocene.

20 Claims, No Drawings

CATALYST FOR THE POLYMERIZATION OF OLEFINS, PROCESS FOR THE PREPARATION THEREOF, AND USE THEREOF

CROSS REFERENCE TO RELATED APPLICATIONS

This application is a divisional application of copending application Ser. No. 08/279,712, filed Jul. 25, 1994, now abandonded, which in turn is a continuation of application of Ser. No. 08/006,753, filed Jan. 21, 1993 entitled Catalyst for the Polymerization of Olefins, Process for the Preparation Thereof, and use Thereof, by Hans-Friedrich Herrmann, Bernd Bachmann, Volker Dolle and Walter Spaleck.

The present invention relates to a heterogeneous (insoluble) catalyst which can advantageously be employed in the polymerization of olefins.

Processes are known for the preparation of polyolefins with the aid of homogeneous catalyst systems comprising a transition-metal component of the metallocene type and a cocatalyst component, an oligomeric aluminum compound of the aluminoxan type (usually methylaluminoxane), which have high activity and give polymers or copolymers having a narrow molecular weight distribution (cf. EP/A-69 951).

A major disadvantage of these soluble (homogeneous) metallocene/methylaluminoxane catalyst systems in processes in which the polymer is formed as a solid is the formation of thick deposits on reactor walls and stirrers. These deposits are always formed by agglomeration (Polymer Commun. (1991) 32, 58) of the polymer particles if metallocene or aluminoxane or both are dissolved in the suspension medium. Deposits of this type in the reactor systems must regularly be removed, since they rapidly achieve considerable thicknesses, have high strength and prevent heat exchange with the cooling medium.

In order to avoid the formation of deposits in the reactor, supported catalyst systems have been proposed, in which the metallocene and/or the aluminum compound serving as cocatalyst are immobilized on an inorganic support material (cf. EP-A-206 794). In addition to the use of an additional support material which is present in the polymerization product formed, these systems have the disadvantage that reactor deposits continue to be formed, in particular in the case of suspension polymerization.

Insoluble aluminoxane products have already been described (J. Am. Chem. Soc., 90 (1968) 3173), but have not been used for polymerization reactions.

EP-A-363 029 describes low-solubility methylaluminoxane which, together with a soluble metallocene and optionally a further soluble aluminum compound, is used as a polymerization catalyst system.

Use of this catalyst system in suspension or bulk polymerization reactions continues to give reactor deposits.

A further disadvantage of polymerization using soluble metallocene/methylaluminoxane systems is the poor bulk densities of the polymer powder produced, and the high proportions of fine particles (<100 µm) sometimes formed. Poor bulk densities cause high costs for removal of the polymer from the reactor, require a complex drying process and also reduce the capacity of the polymerization reactor; the high proportions of fine particles are particularly disadvantageous in the various process steps of further processing of the polymer.

A significant part of the catalyst costs in the case of polymerization using homogeneous metallocene catalyst systems is due to the methylaluminoxane (MAO) or to its preparation from water and trimethylaluminum. The yield of soluble MAO is reduced, in particular, by the formation of insoluble methylaluminoxane, which is up to 10% by weight or more, depending on the intended degree of MAO oligomerization. It is therefore desirable for the insoluble MAO by-products also to have an industrial use.

The object was thus to find a polymerization process or a catalyst system which avoids the disadvantages known from the prior art.

Surprisingly, it has been found that reaction of an aluminum compound A comprising a specific oligomeric aluminoxane with metallocenes B gives a highly active polymerization catalyst which completely prevents reactor deposits.

The invention thus relates to a catalyst for the polymerization of olefins, comprising the product of the reaction of an aluminoxane which is insoluble in aliphatic and aromatic hydrocarbons with at least one metallocene.

The catalyst formed is solid and is insoluble in aliphatic hydrocarbons such as hexane or diesel oil (boiling fraction: 100–120° C.) and likewise in aromatic hydrocarbons such as benzene or toluene (heterogeneous catalyst).

The aluminoxane to be used according to the invention is a solid substance which is likewise insoluble in the above-mentioned solvents. The solid, insoluble aluminoxane is formed as a by-product during the preparation of toluene-soluble aluminoxanes from an organoaluminum compound $AlR_3$ and water. In the compound $AlR_3$, the R radicals are identical or different, preferably identical, and are $C_1$–$C_6$-alkyl, $C_6$–$C_{10}$-aryl or benzyl. In particular, R is a methyl group.

The preparation of said toluene-soluble, oligomeric aluminoxanes can be carried out in a variety of ways and is known from the literature (cf., for example, Polyhedron 9, 1990, 429).

Preference is given to insoluble aluminoxanes formed as by-products in processes in which $AlR_3$ is reacted directly with (free) water. If the water necessary for the reaction is provided in the form of adsorbed or absorbed water, for example as water of crystallization in the reaction of $AlR_3$ with $CuSO_4.5H_2O$, the insoluble aluminoxane formed as by-product is contaminated by metal salts (for example $CuSO_4$) or other inert materials. In principle, however, by-products of this type can also be used according to the invention.

The preparation of soluble, oligomeric aluminoxanes from $AlR_3$ and water is described, for example, in DE-A 4 004 477. The by-products produced therein are preferably used as insoluble aluminoxanes according to the invention.

The process described in DE-A 4 004 477 can be varied by changing the reaction stoichiometry (increase in the amount of water added), so that insoluble, solid aluminoxanes become the major or only reaction product.

The aluminoxanes according to the invention can also be prepared by the process described in EP-A-363 029.

The precise structure of the aluminoxanes according to the invention is not known. They are presumably mixtures of compounds of different composition. The empirical formula of the aluminoxanes preferably employed is $AlO_aR_b$, where $0.5 \leq a \leq 1.3$ and $0.5 \leq b \leq 2$. The R radicals are identical or different, preferably identical, radicals and are $C_1$–$C_6$-alkyl, $C_6$–$C_{10}$-aryl or benzyl. R is preferably $C_1$–$C_4$-alkyl, in particular methyl; ie. insoluble methyl-aluminoxane is particularly preferred.

However, whether an aluminoxane is suitable for the purpose according to the invention is determined less by its empirical formula than by the fact that it must be insoluble, in particular, in toluene and benzene.

The aluminoxanes which have hitherto been used as cocatalysts in polymerization reactions are soluble at least in toluene, but preferably also in other hydrocarbons.

The second starting compound for the preparation of the catalyst according to the invention is a transition-metal compound in the form of a metallocene. It is preferably a metallocene that is reacted with the aluminoxane.

It is also possible to employ a plurality of metallocenes and/or various aluminoxanes as reactants. The catalysts resulting from the use of a plurality of metallocenes are particularly suitable for the preparation of so-called reactor blends.

In principle, it is possible to employ any metallocene, irrespective of its structure and composition. The metallocenes can be either bridged or unbridged, and have identical or different ligands. They are compounds of the metals from Groups IVb, Vb or VIb of the Periodic Table, for example compounds of titanium, zirconium, hafnium, vanadium, niobium, tantalum, chromium, molybdenum or tungsten, preferably of zirconium, hafnium or titanium, in particular of zirconium.

These metallocenes are known and are described, for example, in the following documents: EP-A-336 127, EP-A-336 128, EP-A-387 690, EP-A-387 691, EP-A-302 424, EP-A-129 368, EP-A-320 762, EP-A-284 707, EP-A-316 155, EP-A-351 392, US-A-5,017,714 and J. Organomet. Chem., 342 (1988) 21.

Of particular interest are metallocenes, specifically zirconocenes, which carry indenyl derivatives as ligands. These are preferably the compounds of the formula I

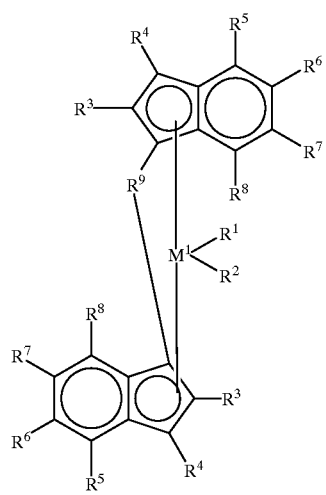

(1)

in which
$M^1$ is a metal from Group IVb, Vb or VIb of the Periodic Table,
$R^1$ and $R^2$ are identical or different and are a hydrogen atom, a $C_1$–$C_{10}$-alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group, a $C_8$–$C_{40}$-arylalkenyl group, an OH group or a halogen atom,
the $R^3$ radicals are identical or different and are a hydrogen atom, a halogen atom, a $C_1$–$C_{10}$-alkyl group, which may be halogenated, a $C_6$–$C_{10}$-aryl group, an —$NR_2$, —$SR$, $OSiR_3$, —$SiR_3$ or —$PR_2$ radical in which R is a halogen atom, a $C_1$–$C_{10}$-alkyl group or a $C_6$–$C_{10}$-aryl group,
$R^4$ to $R^8$ are as defined for $R^3$, or adjacent radicals $R^4$ to $R^8$, together with the atoms connecting them, form an aromatic or aliphatic ring,
$R^9$ is

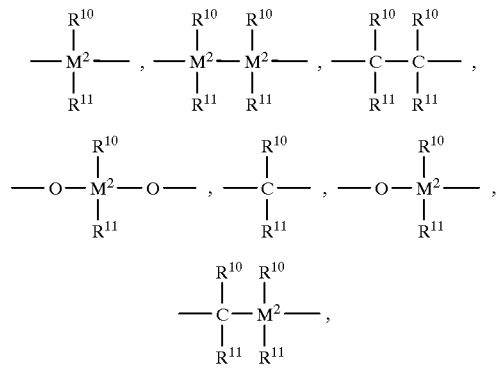

=$BR^{10}$, =$AlR^{10}$, —Ge—, —Sn—, —O—, —S—, =SO, =$SO_2$, =$NR^{10}$, =CO, =$PR^{10}$ or =P(O)$R^{10}$, where
$R^{10}$ and $R^{11}$ are identical or different and are a hydrogen atom, a halogen atom, a $C_1$–$C_{10}$-alkyl group, a $C_1$–$C_{10}$-fluoro-alkyl group, a $C_6$–$C_{10}$-aryl group, a $C_6$–$C_{10}$-fluoroaryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group, or a $C_7$–$C_{14}$-alkylaryl group or $R^{10}$ and $R^{11}$, in each case together with the atoms connecting them form a ring, and $M^2$ is silicon, germanium or tin.

The 4,5,6,7-tetrahydroindenyl analogs corresponding to the compounds I are likewise of importance.

In the formula I, it is preferred that
$M^1$ is zirconium,
$R^1$ and $R^2$ are identical and are methyl or chlorine, in particular chlorine,
$R^3$–$R^8$ are hydrogen or $C_1$–$C_4$-alkyl,
$R^9$ is

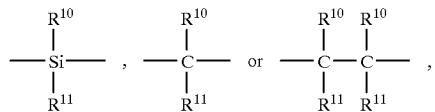

where
$R^{10}$ and $R^{11}$ are identical or different and are $C_1$–$C_4$-alkyl or $C_6$–$C_{10}$-aryl. In particular, $R^{10}$ and $R^{11}$ are identical or different and are methyl or phenyl.

The indenyl or tetrahydroindenyl ligands in the formula I are preferably substituted in the 2-, 2,4-, 4,7-, 2,6-, 2,4,6-, 2,5,6-, 2,4,5,6- or 2,4,5,6,7-position, in particular in the 2,4,6-position. Substitution is preferably by a $C_1$–$C_4$-alkyl group, such as, for example, methyl, ethyl or isopropyl. The 2-position is preferably substituted by methyl.

Of particular importance are furthermore compounds I in which the substituents in the 4- and 5-positions of the indenyl radicals ($R^5$ and $R^6$), together with the atoms connecting them, form a benzene ring. This fused ring system may likewise be substituted by radicals as defined for $R^3$–$R^8$. An example which may be mentioned of such a compound I is dimethylsilanediylbis(2-methyl-4,5-benzoindenyl)zirconium dichloride.

The metallocenes I are particularly suitable for the preparation of high-molecular-weight polyolefins of high stereoregularity.

The metallocenes I and the metallocenes described in the documents mentioned can be prepared, for example, in accordance with the reaction scheme below:

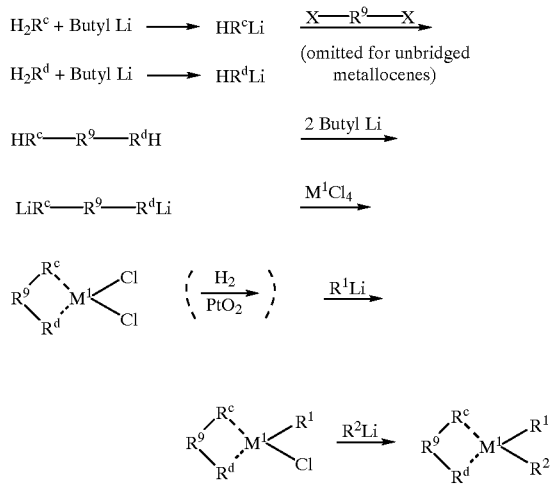

X=Cl, Br, I or O-tosyl; $H_2R^c$ and $H_2R^d$=ligands, for example (subst.)indene

* additional hydrogenation step if, for example, indenyl ligands are to be converted into tetrahydroindenyl ligands.

The preparation processes are known in principle from the literature; cf. Journal of Organometallic Chem. 288 (1985) 63–67, EP-A-320 762 and the documents cited therein concerning the metallocenes described therein.

The starting materials used for the preparation of the compounds I are variously substituted indenes ($H_2R^c$ and $H_2R^d$; cf. the above reaction scheme). Some of these indene derivatives are known and commercially available.

Specifically substituted indenes can be prepared by the process indicated below:

a) $H_2R^c$ and $H_2R^d$=

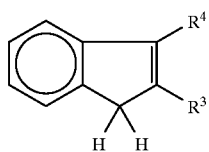

The synthesis is carried out as described in or analogously to the literature references below:

J. Org. Chem., 49 (1984) 4226–4237, J. Chem. Soc., Perkin II, 1981, 403–408, J. Am. Chem. Soc., 106 (1984) 6702, J. Am. Chem. Soc., 65 (1943) 567, J. Med. Chem., 30 (1987) 1303–1308, Chem. Ber. 85 (1952) 78–85.

b) $H_2R^c$ and $H_2R^d$=

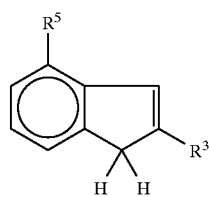

The preparation of the 2,4-substituted indenes $H_2R^c$ and $H_2R^d$ used as starting substances is possible by 2 different routes:

b1) The starting compound used is a keto-aldehyde of the formula shown in the reaction scheme below; its preparation is known (Synthesis 1985, 1058).

The reaction of this keto-aldehyde with cyclopentadiene is carried out in an inert solvent in the presence of a base. Preference is given to alcohols, such as methanol, ethanol or t-butanol, in particular methanol.

The bases used can be a wide range of compounds. Examples which may be mentioned are alkali or alkaline earth metal hydroxides, alkali and alkaline earth metal alkoxides, such as sodium methoxide, sodium ethoxide and sodium tertiary butoxide, amides such as lithium diisopropylamide, and amines. Preference is given to sodium ethoxide, potassium tertiary butoxide and potassium hydroxide.

The molar ratios between starting compounds, including the base used, can vary within broad limits. The ketoaldehyde:cyclopentadiene:base molar ratio is preferably from 1:1–1.5:2–3, in particular 1:1.1:2.5.

The reaction temperature is preferably from –40 to 100° C., in particular from 0 to 25° C.

The reaction times generally vary between 10 minutes and 100 hours, preferably between 1 hour and 30 hours.

The substituent in the 2-position can be introduced by a Grignard reaction after the 4-monosubstituted indene has been converted into the 4-monosubstituted 2-indanone by a general working procedure (Organic Synthesis, Coll. Vol. V, 1973, 647). The subsequent elimination of water gives the 2,4-substituted indenes.

The 2,4-substituted indenes are produced in the form of double-bond isomers, which can be employed directly for the synthesis of the corresponding metallocene complexes.

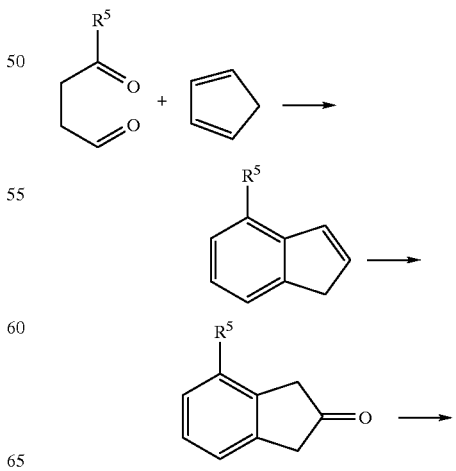

-continued

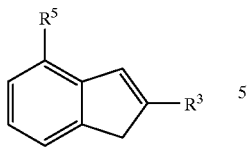

b2) Another possible and advantageous strategy proceeds in accordance with the scheme below:

A 2-substituted benzyl halide is reacted with an appropriately substituted malonic diester analogously to a process known from the literature (J. Org. Chem. 1958, 23, 1437) to give the disubstituted malonic diester.

Hydrolysis of the diester and decarboxylation by conventional processes gives a disubstituted propionic acid derivative.

Ring closure to give the 2,4-disubstituted 1-indanone is carried out by customary processes (Friedel-Crafts reaction) after the carboxylic acid has been converted into the carboxylic acid chloride.

Reduction of the ketone by known methods and subsequent elimination of water gives the 2,4-disubstituted indenes.

c) $H_2R^c$ and $H_2R^d$ =

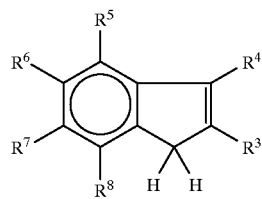

The compounds $H_2R^c$ and $H_2R^d$ are prepared by reacting a compound II

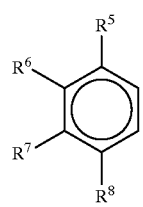

with a compound III

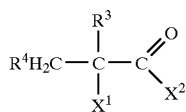

or the anhydride thereof in the presence of a Friedel-Crafts catalyst. In this formula, $X^1$ and $X^2$ are a nucleophilic leaving group, such as, for example, halogen, a hydroxyl group or a tosyl group, in particular bromine or chlorine.

This gives the indanones IV or IVa

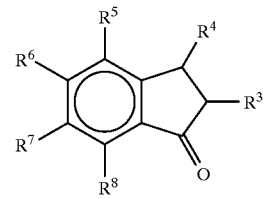

(IV)

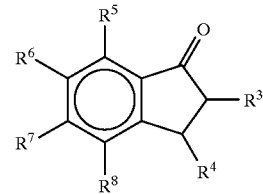

(IVc)

The indanones can be formed as two constitutional isomers of the formula IV and IVa, depending on the substitution pattern on the aromatic ring. These, in pure form or as a mixture, can be reduced to the corresponding indanols by methods known from the literature using reducing agents such as $NaBH_4$ or $LiAlH_4$, and subsequently dehydrated to give indenes of the formula V or Va ($H_2R^c/H_2R^d$) by means of acids such as sulfuric acid, oxalic acid or p-toluenesulfonic acid, or alternatively by treatment with dehydrating substances, such as magnesium sulfate, sodium sulfate, aluminum oxide, silica gel or molecular sieve (Bull. Soc. Chim. Fr. 11 (1973) 3092; Organomet. 9 (1990) 3098).

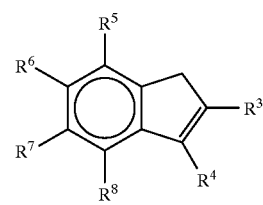

(V)

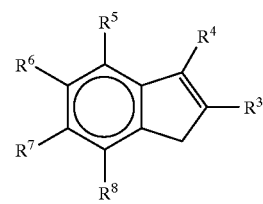

(Va)

Examples of suitable Friedel-Crafts catalysts are $AlCl_3$, $AlBr_3$, $FeCl_3$, $SbCl_5$, $SnCl_4$, $BF_3$, $TiCl_4$, $ZnCl_2$, $H_2SO_4$, polyphosphoric acid, $H_3PO_4$ or an $AlCl_3/NaCl$ melt, in particular $AlCl_3$.

The starting compounds of the formulae II and III are known and commercially available or can be prepared by processes known from the literature.

The reaction is carried out in an inert solvent. Methylene chloride or $CS_2$ is preferred. If the starting components are liquid, there is no need to use a solvent.

The molar ratios between the starting compounds, including the Friedel-Crafts catalyst, can vary within broad limits. The compound II:III: catalyst molar ratio is preferably from 1:0.5–1.5:1–5, in particular 1:1:2.5–3.

The reaction temperature is preferably from 0 to 130° C., in particular from 25 to 80° C.

The reaction times generally vary between 30 minutes and 100 hours, preferably between 2 hours and 30 hours.

In a preferred procedure, the Friedel-Crafts catalyst is metered into a mixture of the compounds II and III. The reverse sequence of addition is also possible.

The indanones of the formula IV and IVa can be purified by distillation, column chromatography or crystallization.

The substituted indenes can be formed as double-bond isomers (V/Va). These can be purified from by-products by distillation, column chromatography or crystallization.

Starting from the indenes of the formulae V and Va, which can be employed as a mixture of isomers, the preparation of the metallocenes I proceeds by processes known from the literature (cf. AU-A-31 478/89, J. Organomet. Chem. 342 (1988) 21, and EP-A-284 707), in accordance with the reaction scheme shown.

d) $H_2R^c$ and $H_2R^d$=

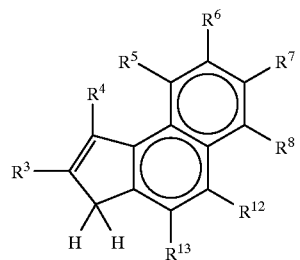

where $R^{12}$ and $R^{13}$ are as defined for $R^4$–$R^8$

These benzo-fused indenes are prepared and further converted into the metallocenes I as shown in the reaction scheme below:

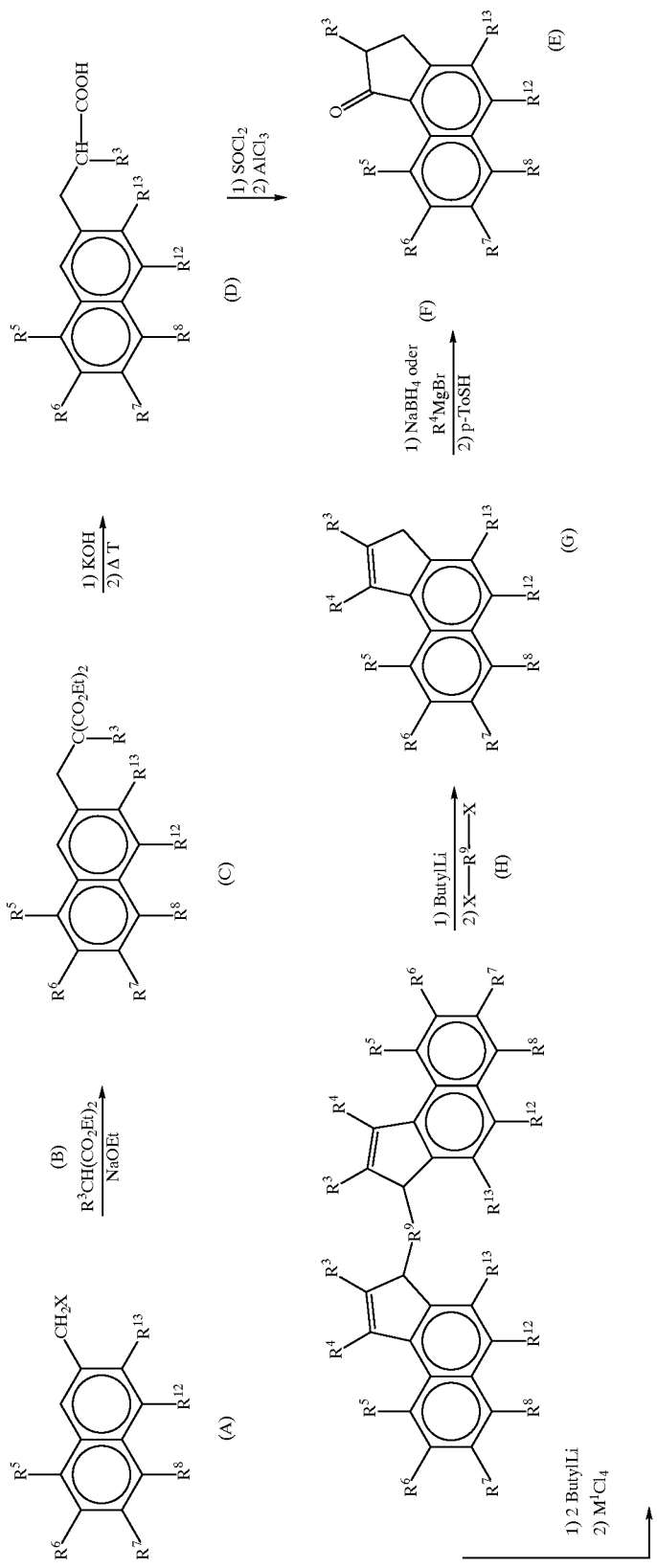

-continued
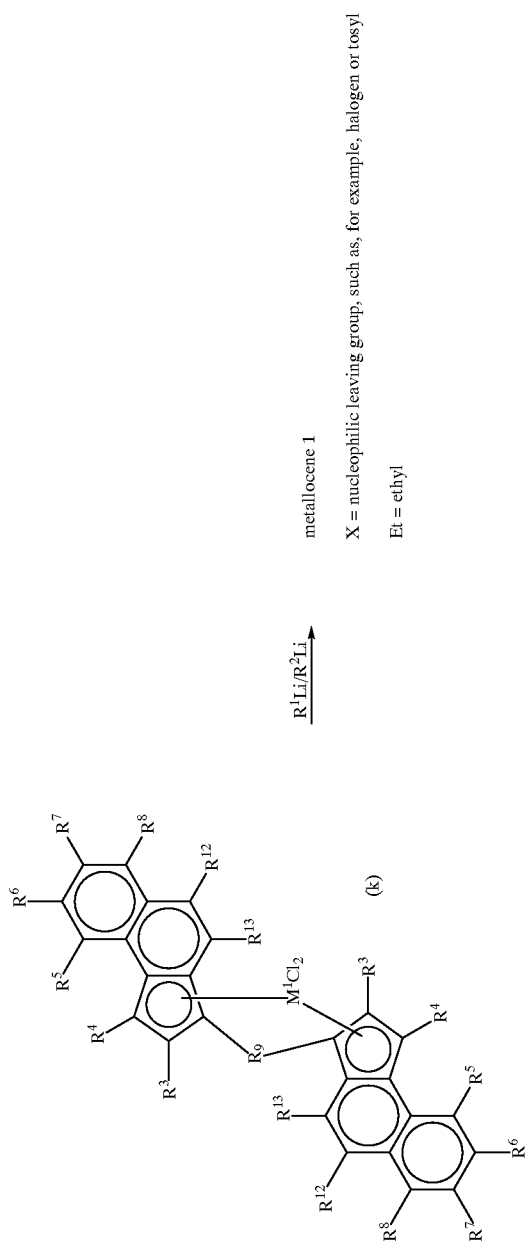
metallocene 1
X = nucleophilic leaving group, such as, for example, halogen or tosyl
Et = ethyl The naphthalene derivatives of the formula A are commercially available or can be prepared by methods known from the literature ("Friedel Crafts and Related Reactions", Wiley, New York, 1964, Vol. II, pp. 659–766, Bull. Soc. Chim. Belges, 58 (1949) 87, J. Amer. Chem. Soc. 89 (1967) 2411).

The conversion to the compounds of the formula C is carried out by methods known from the literature by reaction with substituted malonic esters of the formula B under basic conditions, such as, for example, in ethanolic solutions of sodium ethoxide (J. Org. Chem. 23 (1958) 1441, J. Am. Chem. Soc. 70 (1948) 3569).

The compounds of the formula C are hydrolyzed by methods known from the literature using alkali metal hydroxides, such as potassium hydroxide or sodium hydroxide, and decarboxylated by methods known from the literature by thermolysis of the resultant dicarboxylic acid to give the compounds of the formula D (J. Org. Chem. 23 (1958) 1441, J. Am. Chem. Soc. 70 (1948) 3569).

The ring closure to give the substituted benzoindanones of the formula E is carried out by methods known from the literature by reaction with chlorinating reagents, such as, for example, $SOCl_2$, to give the corresponding acid chlorides and subsequent cyclization by means of a Friedel-Crafts catalyst in an inert solvent, such as, for example, using $AlCl_3$ or polyphosphoric acid in methylene chloride or $CS_2$ (Organometallics 9 (1990) 3098, Bull. Soc. Chim. Fr. 3 (1967) 988, J. Org. Chem. 49 (1984) 4226).

The conversion to the benzoindene derivatives of the formula G is carried out by methods known from the literature by reduction using sodium borohydride or lithium aluminum hydride in an inert solvent, such as, for example, diethyl ether or THF, or by alkylation using alkylating agents of the formula F or using alkyllithium compounds to give the corresponding alcohols and dehydration of the alcohols under acidic conditions, such as, for example, using p-toluenesulfonic acid or oxalic acid, or by reaction with dehydrating substances, such as magnesium sulfate or molecular sieve (Organometallics 9 (1990) 3098, Acta Chem. Scand. B 30 (1976) 527, J. Amer. Chem. Soc. 65 (1943) 567).

The benzoindene derivatives of the formula G can also be synthesized by another synthetic route, not shown in greater detail here, in 4 synthesis steps starting from substituted naphthalenes (Bull. Soc. Chim. Fr. 3 (1967) 988).

The preparation of ligand systems of the formula J and the conversion to the bridged chiral metallocenes of the formula K and the isolation of the desired racemic form is known in principle (AU-A-31 478/89, J. Organomet. Chem. 342 (1988) 21, EP 0 284 707 and EP 0 320 762). To this end, the benzoindene derivative of the formula G is deprotonated using strong bases, such as, for example, butyllithium in an inert solvent and reacted with a reagent of the formula H to give the ligand system of the formula J. This is subsequently deprotonated using two equivalents of a strong base, such as, for example, butyllithium in an inert solvent and reacted with the corresponding metal tetrahalide, such as, for example, zirconium tetrachloride, in a suitable solvent. Suitable solvents are aliphatic and aromatic solvents, such as, for example, hexane and toluene, ethereal solvents, such as, for example, tetrahydrofuran and diethyl ether, and halogenated hydrocarbons, such as, for example, methylene chloride. The racemic and meso forms are separated by extraction or recrystallization using suitable solvents.

The derivatization to give the metallocenes of the formula I can be carried out by methods known from the literature, for example by reaction with alkylating agents, such as, for example, methyllithium (Organometallics 9 (1990) 1539, J. Amer. Chem. Soc. 95 (1973) 6263 and EP 0 277 004).

Examples which may be mentioned of metallocenes which can be used according to the invention are the following compounds:
biscyclopentadienylzirconium dichloride,
biscyclopentadienyldimethylzirconium,
biscyclopentadienyldiphenylzirconium,
biscyclopentadienyldibenzylzirconium,
biscyclopentadienylbistrimethylsilylzirconium,
bis(methylcyclopentadienyl)zirconium dichloride,
bis(1,2-dimethylcyclopentadienyl)zirconium dichloride,
bis(1,3-dimethylcyclopentadienyl)zirconium dichloride,
bis(1,2,4-trimethylcyclopentadienyl)zirconium dichloride,
bis(1,2,3-trimethylcyclopentadienyl)zirconium dichloride,
bis(pentamethylcyclopentadienyl)zirconium dichloride,
bisindenylzirconium dichloride,
diphenylmethylene(9-fluorenyl)(cyclopentadienyl) zirconium dichloride,
dimethylsilyl(9-fluorenyl)(cyclopentadienyl)zirconium dichloride,
isopropylidene(9-fluorenyl)(cyclopentadienyl)zirconium dichloride,
dimethylsilylbis-1-tetrahydroindenylzirconium dichloride,
dimethylsilylbis-1-(2-methyltetrahydroindenyl)zirconium dichloride,
dimethylsilylbis-1-(2,3,5-trimethylcyclopentadienyl) zirconium dichloride,
dimethylsilylbis-1-(2,4-dimethylcyclopentadienyl) zirconium dichloride,
dimethylsilylbis-1-indenylzirconium dichloride,
dimethylsilylbis-1-indenylzirconiumdimethyl,
dimethylgermylbis-1-indenylzirconium dichloride,
dimethylsilylbis-1-(2-methylindenyl)zirconium dichloride,
dimethylsilylbis-1-(2-methyl-4-isopropylindenyl)zirconium dichloride,
phenylmethylsilylbis-1-(2-methylindenyl)zirconium dichloride,
dimethylsilylbis-1-(2-methyl-4-ethylindenyl)zirconium dichloride,
ethylenebis-1-(4,7-dimethylindenyl)zirconium dichloride,
phenyl(methyl)silylbis-1-indenylzirconium dichloride,
phenyl(vinyl)silylbis-1-indenylzirconium dichloride,
diphenylsilylbis-1-indenylzirconium dichloride,
dimethylsilylbis(1-(2-methyl-4-tert-butylindenyl) zirconium dichloride,
methylphenylsilylbis(1-(2-methyl-4-isopropylindenyl) zirconium dichloride,
dimethylsilylbis(1-(2-ethyl-4-methylindenyl)zirconium dichloride,
dimethylsilylbis(1-(2,4-dimethylindenyl)zirconium dichloride,
dimethylsilylbis(1-(2-methyl-4-ethylindenyl) dimethylzirconium,
dimethylsilylbis(2-methyl-4,6-diisopropylindenyl) zirconium dichloride,
dimethylsilylbis(2,4,6-trimethylindenyl)zirconium dichloride,
methylphenylsilylbis(2-methyl-4,6-diisopropylindenyl) zirconium dichloride,
1,2-ethanediylbis (2-methyl-4,6-diisopropylindenyl) zirconium dichloride
and dimethylsilylbis(2-methyl-4,5-benzoindenyl)zirconium dichloride.

In the preparation of the catalyst according to the invention, chiral metallocenes are preferably employed as a racemate. However, it is also possible to use the pure R or S form. Using these pure stereoisomeric forms an optically active polymer can be prepared. However, the meso form of the metallocenes should be removed, since the polymerization-active center (the metal atom) in these compounds is no longer chiral due to mirror symmetry at the central metal and it is therefore impossible to form a highly tactic polymer. If the meso form is not removed, an atactic polymer is formed in addition to isotactic and syndiotactic polymers. For certain applications—soft moldings for example—or for the preparation of polyethylene grades, this may be entirely desirable.

The present invention furthermore relates to a process for the preparation of the catalyst. This is carried out at a temperature between −10 and +120° C., preferably at 20° C., by reacting the aluminum compound (the insoluble aluminoxane) with the metallocene. The insoluble aluminum compound, as a suspension with 1–40% by weight, preferably with 15–20% by weight, in an inert suspending agent, such as toluene, n-decane, hexane, diesel oil or dichloromethane, is mixed with the solid metallocene or a concentrated solution of the metallocene in an inert solvent, such as toluene, hexane or dichloromethane, or the aluminum compound, as a fine powder, is mixed with a solution of the metallocene in an inert solvent, such as toluene, hexane or dichloromethane. The reaction is carried out with vigorous mixing, for example by stirring.

The Al:$M^1$ (central metal of the metallocene) molar ratio is preferably from 100:1 to 10000:1, in particular from 100:1 to 2000:1. However, any other Al:$M^1$ ratio (aluminum compound:metallocene) can also be achieved and is covered by the present invention.

The reaction time is generally between 5 and 120 minutes, preferably 10–30 minutes, under inert conditions.

During the reaction for the preparation of the catalyst, in particular when metallocenes are used, changes in the color of the reaction mixture occur with absorption maxima in the visible region, and allow the progress of the reaction to be followed.

When the reaction is complete, the supernatant solution is separated off, for example by filtration or decantation, and the solid which remains is washed, preferably 1 to 5 times, with an inert suspending agent, such as toluene, n-decane, hexane, diesel oil or dichloromethane. This washing operation (extraction) serves to remove soluble constituents in the catalyst formed, in particular to remove unreacted and thus soluble metallocenes.

It is advantageous, but not necessary, to carry out the entire process in a pressure filter, it also being possible to use various inert solvents for washing the solid. The filtrate and the wash liquids are colorless, irrespective of the metallocene previously employed.

The catalyst prepared in this way can be dried in vacuo and re-suspended as a powder or still containing traces of solvent, and, as a suspension in an inert suspending agent, such as, for example, toluene, hexane, diesel oil or dichloromethane, is metered into the polymerization system.

The olefin polymerization catalyst according to the invention is thus prepared in a separate operation outside the polymerization reactor.

The present invention furthermore relates to a process for the preparation of an olefin polymer by polymerization or copolymerization of an olefin of the formula $R^a$—CH=CH—$R^b$, in which $R^a$ and $R^b$ are identical or different and are a hydrogen atom or a hydrocarbon radical having 1 to 14 carbon atoms, or $R^a$ and $R^b$, together with the atoms connecting them, can form a ring, at a temperature of from −60 to 200° C., at a pressure of from 0.5 to 100 bar, in solution, in suspension or in the gas phase, in the presence of a catalyst, wherein the catalyst used is the reaction product according to the invention.

The polymerization or copolymerization is carried out in a known manner in solution, in suspension or in the gas phase, continuously or batchwise, in one or more steps, at a temperature of from −60 to 200° C., preferably from 30 to 80° C., particularly preferably from 50 to 80° C. The polymerization or copolymerization is performed on olefins of the formula $R^a$—CH=CH—$R^b$. In this formula, $R^a$ and $R^b$ are identical or different and are a hydrogen atom or an alkyl radical having 1 to 14 carbon atoms. However, $R^a$ and $R^b$, together with the carbon atoms connecting them, may also form a ring. Examples of such olefins are ethylene, propylene, 1-butylene, 1-hexene, 4-methyl-1-pentene, 1-octene, norbornene, norbonadiene and 1,4,5,8-dimethano-1,2,3,4,4a,5,8,8a-octahydronaphthalene (DMON). In particular, propylene and ethylene are polymerized or copolymerized.

As molecular weight regulator and/or to increase the activity, hydrogen is added if necessary. The overall pressure in the polymerization system is from 0.5 to 100 bar. Polymerization is preferably carried out in the pressure range of from 5 to 64 bar which is particularly interesting in industry.

The catalyst according to the invention is preferably used in a concentration, based on the transition metal, of from $10^{-3}$ to $10^{-8}$, preferably from $10^{-4}$ to $10^{-7}$, mol of transition metal per $dm^3$ of solvent or per $dm^3$ of reactor volume.

If the polymerization is carried out in suspension or solution, an inert solvent which is customary for the Ziegler low-pressure process is used. For example, the process is carried out in an aliphatic or cycloaliphatic hydrocarbon; examples of these which may be mentioned are butane, pentane, hexane, heptane, isooctane, cyclohexane and methylcyclohexane.

It is furthermore possible to use a benzine or hydrogenated diesel oil fraction. Toluene can also be used. The polymerization is preferably carried out in the liquid monomer.

If inert solvents are used, the monomers are metered in gas or liquid form.

The polymerization can have any desired duration since the catalyst system to be used according to the invention only exhibits a slight time-dependent drop in the polymerization activity.

Before the catalyst is introduced into the reactor, another alkylaluminum compound, such as, for example, trimethylaluminum, triethylaluminum, triisobutylaluminum or isoprenylaluminum, can additionally be added to the polymerization system in a concentration of from 1 to 0.001 mmol of Al per kg of reactor contents in order to render the polymerization system inert (for example to remove catalyst poisons present in the olefin); the total amount of additional alkylaluminum compound should reach a maximum of 10 mol % of Al, preferably a maximum of 1 mol % of Al, based on the amount of Al present in the catalyst.

However, the use of further substances for catalysis of the polymerization reaction is fundamentally unnecessary, i.e. the catalyst according to the invention can—and this is preferred—be used as the only catalyst for the olefin polymerization.

The molecular weight of the polymer formed can also be influenced by changing the polymerization temperature, periodic changes or a multistep process or the use of a plurality of metallocenes also allowing polymers with a broad distribution to be prepared.

In addition, the polymer molecular weight achieved by means of the solid catalyst according to the invention is determined by the type of metallocene used, by the aluminum compound and by the Al/M$^1$ ratio.

The process according to the invention (the catalyst according to the invention) is primarily distinguished by the fact that the undesired reactor deposits are prevented in the polymerization. A further advantage of the process is that the polymer molecular weight is influenced favorably. In particular in the case of propene polymerization reactions, the polymer molecular weight can be significantly changed compared with the prior art, ie. a comparative system comprising the mixture of the same metallocene and soluble aluminoxane, by using the catalyst according to the invention. Thus, the achievable polymer molecular weight can be increased for metallocenes which tend to form low molecular weights in the comparative system, or reduced for metallocenes which tend to form high molecular weights in the comparative system.

In addition, the grain morphology of the polymer powder prepared is significantly improved. A narrow particle size distribution is attained, while simultaneously avoiding a coarse component >1500 μm and a fine component <100 μm.

The examples below are intended to illustrate the invention in greater detail:

All glass equipment was heated in vacuo and flushed with argon. All operations were carried out in Schlenk vessels with the exclusion of moisture and oxygen. The solvents used were all freshly distilled over Na/K alloy under argon and stored in Schlenk vessels.

The Al/CH$_3$ ratio in the aluminoxane was determined by decomposing the sample using H$_2$SO$_4$ and determining the volume of the resultant hydrolysis gases under standard conditions and by complexometric titration of the aluminum in the then-dissolved sample by the Schwarzenbach method.

The polymer melting points indicated were taken from a DSC measurement for the 2nd melting (10°/min).

For the experiments with the insoluble aluminum compound (methylaluminoxane), referred to as P-MAO below, an approximately 17% strength by weight suspension in toluene, containing 86 mg of Al/ml according to aluminum determination, was prepared. Analysis of this batch, used below, gave an Al:CH$_3$ molar ratio of 1:0.97.

Toluene-soluble methylaluminoxane was employed as a 10% strength toluene solution for the comparative examples and contained 36 mg of Al/ml according to aluminum determination. The mean degree of oligomerization according to freezing point depression in benzene was n=20. An Al:CH$_3$ ratio of 1:1.55 was determined for the toluene-soluble methylaluminoxane.

EXAMPLE 1

8.7 ml of the suspension of the P-MAO in toluene are introduced into a G3 Schlenk frit under argon and filtered. The solid which remains is resuspended in 20 ml of an aromatic-free, inert diesel oil (boiling point 100 to 120° C.). 0.5 ml of a 1/500 molar solution of zirconocene dichloride (biscyclopentadienylzirconium dichloride) in absolute toluene is metered into this suspension, and the mixture is stirred at 30° C. for ¼ hour. The mixture is subsequently filtered, and the solid which remains is washed with 20 ml of diesel oil and resuspended in 20 ml of diesel oil for the polymerization.

Polymerization

A dry 1.5 dm$^3$ stirred reactor is flushed with nitrogen in order to remove the oxygen and filled with 0.9 dm$^3$ of an inert diesel oil (boiling point 100–120° C.). The reactor is flushed with ethylene and heated to and held at 70° C., and the catalyst suspension is metered in at an ethylene pressure of 7 bar without introduction of additional activator. After 2 hours, the pressure in the reactor is released, and the polymer is filtered off from the suspension and dried in a vacuum drying cabinet for 12 hours, giving 49.5 g of polyethylene having a viscosity number of 400 cm$^3$/g and a bulk density of 0.120 kg/dm$^3$. The reactor shows no deposits on reactor walls or stirrer.

COMPARATIVE EXAMPLE 1

The polymerization from Example 1 is repeated with the difference that the catalyst used is 0.029 mg of zirconocene dichloride dissolved in a 10% strength by weight solution of methylaluminoxane in toluene (12 mmol Al). Under otherwise identical conditions, 40 g of polyethylene having a viscosity number of 380 cm$^3$/g and a bulk density of 0.060 kg/dm$^3$ are obtained. After the reactor is opened, a deposit 1 mm in thickness is visible over all the reactor walls and stirrer.

COMPARATIVE EXAMPLE 2

The polymerization from Comparative Example 1 is repeated with the difference that 40 ml of the toluene solution which is supernatant in the case of P-MAO is employed instead of the 10% strength by weight methylaluminoxane solution. However, under otherwise identical conditions no polymerization occurs.

EXAMPLE 2

The catalyst preparation from Example 1 is repeated with the difference that the washing is carried out not with diesel oil (boiling point 100–120° C.) but instead with anhydrous hexane. The catalyst is subsequently dried for 2 hours at 10$^{-3}$ mbar and 30° C., giving 1.50 g of a free-flowing powder. Analysis shows 44.4% by weight of Al and 49 ppm of Zr.

1400 mg of the dry catalyst are mixed with 80 g of polystyrene powder as a stirring aid, and the polymerization is carried out in a 1.5 dm$^3$ reactor with a paddle stirrer for 2 hours at 70° C. and 7 bar of ethylene. After the pressure in the reactor has been released, 122 g of powder are removed, giving, after extraction with boiling toluene, 42 g of a polyethylene having a viscosity number of 455 cm$^3$/g.

EXAMPLE 3

20 ml of a suspension of P-MAO are introduced into a G3 Schlenk frit under argon and filtered. The solid which remains is resuspended in 40 ml of an aromatic-free, inert diesel oil (boiling point 100 to 120° C.). 5 mg of rac-dimethylsilylbis-1-(2-methylindenyl)zirconium dichloride are dissolved in a little toluene and metered in under argon. After 15 minutes, the solution is filtered, and the solid is washed with diesel oil and then resuspended in 20 ml of diesel oil.

Polymerization

A dry, nitrogen-flushed 16 dm$^3$ reactor is filled with 10 dm$^3$ of propylene and held at 30° C. After 15 minutes, the catalyst suspension is metered via a pressure lock without further addition of activator. On commencement of the polymerization, the internal reactor temperature is increased to the polymerization temperature of 70° C. at 10°/min by additional supply of heat and is subsequently kept at this temperature by cooling. After a polymerization time of 1 hour, the polymerization is terminated by addition of isopropanol, the pressure in the reactor is released and the reactor is opened. The reactor wall and the stirrer are completely free of deposits. Vacuum drying of the product gives 0.37 kg of free-flowing polypropylene powder having a viscosity number of 154 cm$^3$/g and a melting point (DSC) of 143.1° C. The mean particle diameter $d_{50}$, measured by screen analysis, is 450 μm.

COMPARATIVE EXAMPLE 3

To prepare the catalyst, 5.2 mg of rac-dimethylsilylbis-1-(2-methylindenyl)zirconium dichloride are dissolved in 20 cm$^3$ of a toluene solution of methylaluminoxane (corresponding to 27 mmol of Al) and preactivated by standing for 15 minutes (cf. EP-A 302 424).

In parallel, a dry 16 dm$^3$ reactor is flushed with nitrogen and filled with 10 dm$^3$ liquid propene. 30 cm$^3$ of the toluene solution of methylaluminoxane (corresponding to 40 mmol of Al) are introduced into this reactor and stirred at 30° C. for 15 minutes. The catalyst solution is then introduced into the reactor, and the polymerization system is heated to the polymerization temperature T of 70° C. (10° C./min) by supply of heat and kept at this temperature for 1 hour by cooling. The polymerization is then terminated by addition of 5 ml of isopropanol, the pressure in the reactor is released and the reactor is opened. A continuous deposit of 3 mm in thickness is apparent. Vacuum drying of the product gives 1.3 kg of polypropylene having a viscosity number of 151 cm$^3$/g and a melting point (DSC) of 145° C. The mean particle diameter $d_{50}$, measured by screen analysis, is 350 μm.

EXAMPLE 4

The procedure is as described in Example 3, with the difference that the metallocene used is 5.1 mg of rac-dimethylsilylbis-1-(2-methyl-4-ethylindenyl)zirconium dichloride. The reactor is free from deposits on walls and stirrer. Vacuum drying of the product gives 0.33 kg of free-flowing polypropylene powder having a viscosity number of 184 cm$^3$/g, $M_w$=1.91×10$^5$ g/mol, $M_w/M_n$=2.3 and a melting point (DSC) of 142.0° C. The mean particle diameter $d_{50}$, measured by screen analysis, is 650 μm, and the proportion of fine particles (<100 μm) is 0.5% by weight.

COMPARATIVE EXAMPLE 4

The procedure is as described in Comparative Example 3, with the difference that the metallocene used is 4.4 mg of rac-dimethylsilylbis-1-(2-methyl-4-ethylindenyl)zirconium dichloride. After the polymerization, a continuous deposit 1 mm in thickness is apparent. Vacuum drying of the product gives 1.1 kg of polypropylene having a viscosity number of 113 cm$^3$/g, $M_w$=1.02×10$^5$ g/mol, $M_w/M_n$=2.2 and a melting point (DSC) of 145.1° C. The mean particle diameter $d_{50}$, measured by screen analysis, is 3000 μm, and the proportion of fine particles (<100 μm) is 1.2% by weight.

EXAMPLE 5

The procedure is described in Example 3, with the difference that the metallocene used is 5.0 mg of rac-dimethylsilylbis-1-(2-methyl-4-i-propylindenyl)zirconium dichloride. The reactor is free from deposits on walls and stirrer. Vacuum drying of the product gives 0.32 kg of free-flowing polypropylene powder having a viscosity number of 223 cm$^3$/g, $M_w$=2.55×10$^5$ g/mol, $M_w/M_n$=2.5 and a melting point (DSC) of 146.3° C. The mean particle diameter $d_{50}$, measured by screen analysis, is 650 μm and the proportion of fine particles (<100 μm) is 0.5% by weight.

COMPARATIVE EXAMPLE 5

The procedure is as described in Comparative Example 3 with the difference that the metallocene used is 3.3 mg of rac-dimethylsilylbis-1-(2-methyl-4-i-propylindenyl)-zirconium dichloride. After the polymerization, a continuous deposit 1 mm in thickness is apparent. Vacuum drying of the product gives 1.4 kg of polypropylene having a viscosity number of 165 cm$^3$/g, $M_w$=1.45×10$^5$ g/mol, $M_w/M_n$=2.2 and a melting point (DSC) of 149.6° C. The mean particle diameter $d_{50}$, measured by screen analysis, is 3000 μm and the proportion of fine particles (<100 μm) is 2.2% by weight.

EXAMPLE 6

The procedure is as described in Example 3, with the difference that the metallocene used is 30.4 mg of diphenylmethylene(9-fluorenyl)(cyclopentadienyl) zirconium dichloride. The polymerization is carried out as described above, but at a polymerization temperature T of 50° C. The reactor is free from deposits on walls and stirrer. Vacuum drying of the product gives 0.31 kg of free-flowing syndiotactic polypropylene powder having a viscosity number of 334 cm$^3$/g, $M_w$=3.13×10$^5$ g/mol, $M_{w/Mn}$=2.2 and a melting point (DSC) of 119.5° C. The mean particle diameter $d_{50}$, measured by screen analysis, is 250 μm.

COMPARATIVE EXAMPLE 6

The procedure is as described in Comparative Example 3, with the difference that the metallocene is 9.4 mg of diphenylmethylene(9-fluorenyl)(cyclopentadienyl) zirconium dichloride. After the polymerization, a continuous deposit 2 mm in thickness is apparent. Vacuum drying of the product gives 0.2 kg of syndiotactic polypropylene having a viscosity number of 502 cm$^3$/g, $M_w$=4.97×10$^5$ g/mol, $M_w/M_n$=2.2 and a melting point (DSC) of 134.1° C. The mean particle diameter $d_{50}$, measured by screen analysis, is 2500 μm.

Example of the preparation of insoluble MAO (P-MAO)

EXAMPLE 7

The solids component (P-MAO) is removed from 5000 ml of a commercial solution of 10% strength by weight MAO in toluene, obtained from Schering/Bergkamen, by sedimentation and filtration under inert conditions. This solid content varies from batch to batch since the solid component is frequently removed as undesired due to the filling method used. The solid content of this batch is calculated at 7% by weight of P-MAO, based on the MAO content of the solution. This solid remaining is washed twice with 100 ml of toluene and once with 100 ml of hexane. The solid is subsequently dried in vacuo to constant weight, leaving 35 g of pulverulent P-MAO. Determination of the aluminum content in the solid gave a content of 44.9% by weight of Al in the solid and a Al:CH$_3$ molar ratio of 1:0.95.

8.88 g of the dried P-MAO are suspended in 50 ml of toluene, and 79 mg of rac-dimethylsilylbis-1-(2-methylindenyl)zirconium dichloride, dissolved in 50 ml of toluene, are slowly added dropwise with stirring. The suspension is subsequently stirred at 80° C. for one hour.

The suspension is filtered at room temperature and washed with hexane. The filtrate is colorless. Drying in vacuo leaves a pink, free-flowing powder.

Polymerization

A dry nitrogen-flushed 16 dm³ reactor is filled with 10 dm³ of propylene and held at 30° C. 24 mmol of a 20% strength solution of triisobutylaluminum (TIBA) in a diesel oil are metered in via a pressure lock in order to render the system inert. After 15 minutes, 0.84 g of the dried catalyst, suspended in 50 ml of hexane, are metered in via the pressure lock. On commencement of the polymerization, the internal reactor temperature is increased to the polymerization temperature of 70° C. at 10° C./min by additional supply of heat and subsequently regulated at this temperature by cooling. After a polymerization time of 1 hour, the polymerization is terminated by addition of isopropanol, the pressure in the reactor is released and the reactor is opened. The reactor wall and stirrer are completely free from deposits. Vacuum drying of the product gives 0.25 kg of free-flowing polypropylene powder having a viscosity number of 187 cm³/g and a melting point (DSC) of 147.3° C.

We claim:

1. A process for the preparation of an olefin polymer comprising polymerizating or copolymerizating of an olefin of the formula $R^a$—CH═CH—$R^b$, in which $R^a$ and $R^b$ are identical or different and are a hydrogen atom or a hydrocarbon radical having 1 to 14 carbon atoms, or $R^a$ and $R^b$, together with the atoms connecting them, can form a ring, at a temperature of from −60 to 200° C., at a pressure of from 0.5 to 100 bar, in solution, in suspension or in the gas phase, in the presence of a catalyst comprising at least an aluminoxane obtained by the process of reacting at least one metallocene with an aluminoxane which is insoluble in aliphatic and aromatic hydrocarbons and said aluminoxane is the by-product obtained in the preparation of toluene-soluble aluminoxanes and said by-product was separated from the toluene-soluble aluminoxane reaction mixture.

2. The process as claimed in claim 1, wherein said metallocene is of the formula (I)

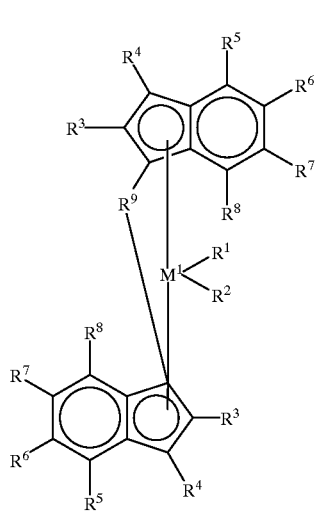

in which $M^1$ is a metal from the Group IVb, Vb or VIb of the Periodic Table, $R^1$ and $R^2$ are identical of different and are a hydrogen atom, a $C_1$–$C_{10}$-alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group, a $C_8$–$C_{40}$-arylalkenyl group, an OH group or a halogen atom, the $R^3$ radicals are identical of different and are a hydrogen atom, a halogen atom, a $C_1$–$C_{10}$-alkyl group, which may be halogenated, a $C_6$–$C_{10}$-aryl group, an —NR$_2$, —SR, OSiR$_3$, —SiR$_3$, or —PR$_2$ radical in which R is a halogen atom, a $C_1$–$C_{10}$-alkyl group or a $C_6$–$C_{10}$-aryl group, $R^4$ to $R^8$ are the same or different and are as defined for $R^3$, or adjacent radicals $R^4$ to $R^8$, together with the atoms connecting them, form an aromatic or aliphatic ring $R^9$ is

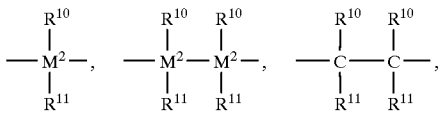

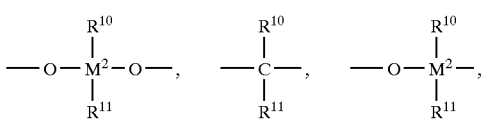

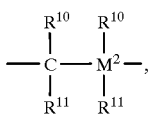

═BR$^{10}$, ═AlR$^{10}$, —Ge—, —Sn—, —O—, —S—, ═SO, ═SO$_2$, ═NR$^{10}$, ═CO, ═PR$^{10}$ or ═P(O) R$^{10}$, where $R^{10}$ and $R^{11}$ are identical or different and are a hydrogen atom, a halogen atom, a $C_1$–$C_{10}$-alkyl group, a $C_1$–$C_{10}$-fluoroalkyl group, a $C_6$–$C_{10}$-aryl group, a $C_6$–$C_{10}$-fluoroaryl group, a $C_1$–$C_{10}$-alkoxy group, a $C_2$–$C_{10}$-alkenyl group, a $C_7$–$C_{10}$-arylalkyl group, a $C_8$–$C_{40}$-arylalkyl group, or a $C_7$–$C_{14}$-alkylaryl group or $R^{10}$ and $R^{11}$, in each case together with the atoms connecting them form a ring, and $M^2$ is silicon, germanium or tin.

3. The process as claimed in claim 2, wherein in the formula I, $M^1$ is zirconium, $R^1$ and $R^2$ are identical and are methyl or chlorine, $R^3$ through $R^8$ are identical or different and are hydrogen or $C_1$–$C_6$-alkyl, $R^9$ is

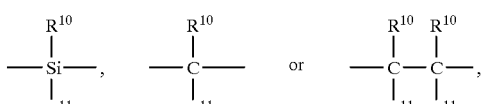

where $R^{10}$ and $R^{11}$ are identical or different and are $C_1$–$C_4$-alkyl or $C_6$–$C_{10}$-aryl.

4. The process as claimed in claim 3, wherein $R^1$ and $R^2$ are identical and are chlorine and the metallocene carries indenyl derivatives as ligands.

5. The process as claimed in claim 1, wherein the aluminoxane has the empirial formula AlO$_a$R$_b$ in which $0.5 \leq a \leq 1.3$ and $0.5 \leq b \leq 2$, and R are identical or different radicals and are $C_1$–$C_6$-alkyl, $C_6$–$C_{10}$-aryl or benzyl.

6. The process as claimed in claim 1, wherein the aluminoxane is a $C_1$–$C_6$-alkylaluminoxane.

7. The process as claimed in claim 1, wherein the aluminoxane is methyl-aluminoxane.

8. The process as claimed in claim 7, wherein the aluminoxane is insoluble in benzene or toluene.

9. The process as claimed in claim 7, wherein the metallocene is selected from the group consisting of biscyclopentadienylzirconium dichloride,
biscyclopentadienyldimethylzirconium,
biscyclopentadienyldiphenylzirconium,
biscyclopentadienyldibenzylzirconium,
biscyclopentadienylbistrimethylsilylzirconium,
bis(methylcyclopentadienyl)zirconium dichloride,
bis(1,2-dimethylcyclopentadienyl)zirconium dichloride,
bis(1,3-dimethylcyclopentadienyl)zirconium dichloride,
bis(1,2,4-trimethylcyclopentadienyl)zirconium dichloride,
bis(1,2,3-trimethylcyclopentadienyl)zirconium dichloride,
bis(pentamethylcyclopentadienyl)zirconium dichloride,
bisindenylzirconium dichloride,
diphenylmethylene(9-fluorenyl)(cyclopentadienyl) zirconium dichloride,
dimethylsilyl (9-fluorenyl)(cyclopentadienyl) zirconium dichloride,
isopropylidene(9-fluorenyl) (cyclopentadienyl)zirconium dichloride,
dimethylsilylbis-1-tetrahydroindenylzirconium dichloride,
dimethylsilylbis-1-(2-methyltetrahydroindenyl) zirconium dichloride,
dimethylsilylbis-1-(2,3,5-trimethylcyclopentadienyl) zirconium dichloride,
dimethylsilylbis-1-(2,4-dimethylcyclopentadienyl) zirconium dichloride,
dimethylsilylbis-1-indenylzirconium dichloride,
dimethylsilylbis-1-indenylzirconiumdimethyl,
dimethylgermylbis-1-indenylzirconium dichloride,
dimethylsilylbis-1-(2-methylindenyl)zirconium dichloride,
dimethylsilylbis-1-(2-methyl-4-isopropylindenyl) zirconium dichloride,
phenylmethylsilylbis-1-(2-methylindenyl)zirconium dichloride,
dimethylsilylbis-1-(2-methyl-4-ethylindenyl)zirconium dichloride,
ethylenebis-1-(4,7-dimethylindenyl)zirconium dichloride,
phenyl(methyl)silylbis-1-indenylzirconium dichloride,
phenyl(vinyl)silylbis-1-indenylzirconium dichloride,
diphenylsilylbis-1-indenylzirconium dichloride,
dimethylsilylbis(1-(2-methyl-4-tert-butylindenyl)) zirconium dichloride,
methylphenylsilylbis(1-(2-methyl-4-isopropylindenyl)) zirconium dichloride,
dimethylsilylbis(1-(2-ethyl-4-methylindenyl)) zirconium dichloride,
dimethylsilylbis(1-(2,4-dimethylindenyl)) zirconium dichloride,
dimethylsilylbis(1-(2-methyl-4-ethylindenyl)) dimethylzirconium,
dimethylsilylbis(2-methyl-4,6-diisopropylindenyl) zirconium dichloride,
dimethylsilylbis(2,4,6-trimethylindenyl)zirconium dichloride,
methylphenylsilylbis(2-methyl-4,6-diisopropylindenyl) zirconium dichloride,
1,2-ethanediylbis(2-methyl-4,6-diisopropylindenyl) zirconium dichloride
and dimethylsilylbis(2-methyl-4,5-benzoindenyl) zirconium dichloride.

10. The process as claimed in claim 1, wherein the reaction is carried out in a reactor with walls and the reactor exhibits no deposits on the reactor walls after the reaction is complete.

11. The process as claimed in claim 1, wherein the polymer has a mean particle diameter greater than 100 $\mu$m.

12. The process as claimed in claim 1, wherein said aluminoxane is dried as a powder and then reacted with said at least one metallocene.

13. A process for the preparation of an olefin polymer comprising polymerizing or copolymerizing an olefin of the formula $R^a$—CH=CH—$R^b$, in which $R^a$ and $R^b$ are identical or different and are a hydrogen atom or a hydrocarbon radical having 1 to 14 carbon atoms, or $R^a$ and $R^b$, together with the atoms connecting them, can form a ring, at a temperature of from –60 to 200° C., at a pressure of from 0.5 to 100 bar, in solution, in suspension or in the gas phase, in the presence of a solid catalyst consisting essentially of at least a solid aluminoxane obtained by the process consisting essentially of reacting at least one metallocene with an aluminoxane which is insoluble in aliphatic and aromatic hydrocarbons and said aluminoxane is the by-product obtained in the preparation of toluene-soluble aluminoxanes by reacting an aluminoxane of the formula $AlR_3$ in which the three R's are identical or different and are $C_1$–$C_6$-alkyl, $C_6$–$C_{10}$-aryl or benzyl, with water to form said aluminoxane which is insoluble in toluene and said by-product was separated from the toluene-soluble aluminoxane reaction mixture by filtration.

14. The process as claimed in claim 13, wherein the reaction is carried out in a reactor with walls and the reactor exhibits no deposits on the reactor walls after the reaction is complete.

15. The process as claimed in claim 13, wherein the polymer has a mean particle diameter greater than 100 $\mu$m.

16. The process as claimed in claim 13, wherein said aluminoxane is dried as a powder and then reacted with said at least one metallocene.

17. A process for the preparation of an olefin polymer consisting essentially of polymerizing or copolymerizing an olefin of the formula $R^a$—CH=CH—$R^b$, in which $R^a$ and $R^b$ are identical or different and are a hydrogen atom or a hydrocarbon radical having 1 to 14 carbon atoms, or $R^a$ and $R^b$, together with the atoms connecting them, form a ring, at a temperature of from –60 to 200° C., at a pressure of from 0.5 to 100 bar, in solution, in suspension or in the gas phase, in the presence of a solid catalyst consisting essentially of at least a solid aluminoxane which is insoluble in toluene obtained by the process consisting essentially of reacting at least one metallocene with an aluminoxane which is insoluble in toluene and said aluminoxane which is insoluble in toluene is obtained by reacting an aluminoxane of the formula $AlR_3$ in which the three R's are identical or different and are $C_1$–$C_6$-alkyl, $C_6$–$C_{10}$-aryl or benzyl, with water to form said aluminoxane, and isolating the fraction which is insoluble in toluene.

18. The process as claimed in claim 17, wherein the reaction is carried out in a reactor with walls and the reactor exhibits no deposits on the reactor walls after the reaction is complete.

19. The process as claimed in claim 18, wherein the polymer has a mean particle diameter greater than 100 μm.

20. A catalyst for the polymerization of olefins which is obtained by the process comprising reacting aluminoxane which is insoluble in toluene and which is obtained as a by product in the preparation of a toluene-soluble aluminoxane, wherein said by product is separated off from the toluene-soluble aluminoxane, with at least one metallocene.

* * * * *